Patented May 18, 1954

2,678,948

UNITED STATES PATENT OFFICE 2,678,948

SUBSTITUTED GLYCINAMIDE

William F. Bruce, Delaware County, and Joseph Seifter, Montgomery County, Pa., assignors, by mesne assignments, to American Home Products Corporation, New York, N. Y., a corporation of Delaware No Drawing. Application March 4, 1950,
Serial No. 147,757

1 Claim. (Cl. 260—558)

This invention relates to new substituted glycinamides, and more particularly relates to glycinamides having the general formula $$R_1NHCH_2CONHR_2$$

where $R_1$ and $R_2$ both represent aralkyl radicals and where $R_1$ stands for an aralkyl having an alkyl chain of 4 carbon atoms.

The compounds disclosed herein which have been found to be particularly useful are branched aralkyl glycinamides or acetamides wherein the amino or left-hand portion of the acetamide molecule has a branched-alkyl chain of four carbon atoms as indicated.

The compounds of the type involved here are useful as intermediates in the formation of other amides and in the preparation of desirable quaternary ammonium compounds. Other, and it is believed, more important uses have been pointed out specifically in our prior application Serial No. 358, filed January 2, 1948, now Patent No. 2,499,352, these uses involving the discovery that certain glycinamides have valuable pharmacological action showing at least one of the following actions: local anesthetic, pressor, spasmolytic, analgesic, sedative and convulsant action.

It is further contemplated that when $R_1$ and $R_2$ represent the radicals indicated above, one or more of the hydrogen atoms on the alkyl chain or on a ring may be replaced by a hydroxy or alkoxy group.

In general, the compounds of the invention may be synthesized by reacting an appropriate chloroacetamide corresponding to the formula $$ClCH_2CONHR_2$$

with an appropriate primary amine corresponding to the formula $R_1NH_2$ where $R_1$ and $R_2$ have the same meaning as indicated hereinabove.

The primary amine may be prepared in known manner. The preferred method for preparation of the chloroacetamide intermediate involves reacting chloroacetylchloride with a primary amine $R_2$—$NH_2$ in the presence of benzene as a solvent for the reactants. Heating may or may not be necessary depending on the speed of the particular reaction. The chloroacetamide remains in solution and is separated from the solvent by distilling off the latter under low pressures. In general, a molar ratio of chloride to amine of about 1:2 is preferred for the reaction.

The reaction of the appropriate chloroacetamide and the appropriate primary amine to form the desired substituted glycinamide is preferably operated with a molar ratio, amide to amine of about 1:1 and is carried out in the presence of a solvent for the reactants such as higher alcohols having four to seven carbon atoms in the molecule, dioxane or hydrocarbon solvents, for example, xylene. The reaction is carried out also in the presence of an acid acceptor or mildly basic material such as alkali or alkaline earth metal carbonates, sodium bicarbonate or alkali metal alcoholates, and preferably about 2 to 3 mols. of this material is used. The reaction operation is set up for refluxing and the temperature is the refluxing temperature of the particular solvent selected. Generally a period of about 10–15 hours is sufficient for complete reaction. In the event that solids are formed, these are removed by filtration, the product remaining in solution in the solvent. The solvent is then removed by distillation at low pressures to obtain the substituted glycinamide product.

It is known that certain amines possess a vasoconstrictor action and are identified as pressor amines. As an important feature of the invention, it has been discovered that when pressor amines, represented by the above-mentioned $R_1NH_2$ or $R_2$—$NH_2$ amines, are used as intermediates in forming the new compounds, and particularly when $R_1NH_2$ is a pressor amine, the new products possess pronounced physiological action. When both amines are pressor amines, even greater physiological action in the new compounds has been noted. Thus in substituted glycinamides corresponding to the formula $$R_1NHCH_2CONHR_2$$

when a pressor amine has been combined, and particularly on the amino side (left-hand side) of the molecule, the compounds possess very considerable anesthetic action and in some cases anesthetic action of a high order combined with pressor action. While certain pressor amines may themselves possess a certain small amount of local anesthetic action, a surprising increase in anesthetic action has been found in the corresponding glycinamide compounds.

Certain of the compounds of the invention have been found also to possess not only a local anesthetic action superior to cocaine, but also a spasmolytic or anti-spasmodic action, while at the same time having a toxicity considerably below that of cocaine.

Proceeding to a better understanding of this invention, an illustrative specific procedure for the preparation of representative compounds falling within the general formula is set forth in the following examples.

EXAMPLE I

*Preparation of omega-phenyl-tert.-butylamino-N-diphenylmethyl acetamide*

To 450 cc. of n-butyl alcohol contained in a one liter 3-neck flask, fitted with a mechanical stirrer, reflux condenser and a thermometer was added 10 g. of omega-phenyl-tert.-butylamine, 15 g. of chloro-N-diphenylmethyl acetamide and 30 g. of sodium carbonate. The reaction mixture was heated at 100° C. overnight. It was filtered hot to remove the inorganic salts. The salts were washed with n-butyl alcohol and the washings added to the filtrate. The latter was washed with sodium carbonate solution until no halogen could be detected by the Beilstein test. The filtrate was dried over magnesium sulfate and the alcohol distilled off under vacuum. The product was fractionated. B. P. 160–165° C. at 0.4 mm.

In the same way, chloro-N-diphenylmethyl acetamide may be reacted with 1,1-dimethyl-2-hydroxy-2-phenylethylamine, using the same molar ratios, to form alpha-1,1-dimethyl-2-hydroxy-2-phenylethylamino-N-diphenylmethyl acetamide.

EXAMPLE II

*Preparation of omega-phenyl-tert.-butylamino-N-omega-phenyl-tert.-butyl acetamide*

To 500 cc. of n-butyl alcohol contained in a one liter 3-neck flask fitted with a mechanical stirrer, reflux condenser and a thermometer was added 10 g. of omega-phenyl-tert.-butylamine, 15 g. of chloro-N-omega-phenyl-tert.-butyl acetamide and 50 g. of sodium carbonate. The reaction mixture was heated at 100° C. overnight. The reaction mixture was filtered hot to remove the inorganic salts formed. The salts were washed with n-butyl alcohol and the washings added to the filtrate. This was washed with sodium carbonate solution until no halogen could be detected by the Beilstein test. The filtrate was then dried over magnesium sulfate and the alcohol distilled off under vacuum. The product was fractionated. B. P. 200–204° C. at 0.5 mm.

EXAMPLE III

*Preparation of alpha-isopropylbenzylamino-N-alpha-isopropylbenzyl acetamide*

A mixture of 0.2 mol. isobutyrophenone and 0.5 mol. of ammonia is shaken with 0.3 g. of platinum oxide to give 0.1 mol. of phenylisopropylcarbinamine. This is treated with 0.1 mol. of chloroacetylchloride to give 0.1 mol. of chloroacetophenylisopropyl carbinamine. The latter is then condensed with phenylisopropyl carbinamine to give 0.07 mol. of the glycinamide.

In the manner taught by the examples, using the same molar ratios, one may react 0.1 mol. of chloroacetylchloride with 0.1 mol. of 1-methyl-2-phenylethylamine to give chloro-N-1-methyl-2-phenylethyl acetamide. The latter may then be reacted with omega-phenyl-tert.-butylamine to give alpha-1,1-dimethyl-2-phenylethylamino-N-1-methyl-2-phenylethyl acetamide.

Substantially all of the products of the invention are high boiling basic liquids of limited solubility. It is contemplated within the scope of this invention that while the products may be used in their basic form, they may also be prepared and used in the well-known manner in the form of their acid-addition salts. The preparation of such a salt is well-known and generally involves the addition of the selected acid to an ether, alcohol or water solution of the basic product. The acid is chosen to yield a salt which is known to those skilled in the art as being physiologically non-toxic. As examples, the hydrochloride, sulfate or acetate salts of the new products may be used.

It is further contemplated that those substituted glycinamides, or the non-toxic salts thereof, which are less soluble in dilute acid than 0.5% by weight, may be brought into satisfactory solution by the use of solubilizing, surface-active, emulsifying or detergent agents in order to obtain a more complete physiological effect of the specific substituted glycinamide. Lipoid solvents having a physiologically non-toxic effect such as long chain fatty acid partial esters of hexitol anhydrides or oxyalkylene derivatives thereof, vegetable and animal oils and ointment bases such as petroleum jelly or cholesterol are examples of solvents that are considered useful in admixture with the substituted glycinamides for obtaining an enhanced physiological effect.

We claim:

The new compound, alpha-N-(1,1-dimethyl-2-phenylethylamino)-N-diphenylmethyl acetamide.

References Cited in the file of this patent

UNITED STATES PATENTS

| Number | Name | Date |
|---|---|---|
| 2,449,638 | Bruce | Sept. 21, 1948 |
| 2,499,352 | Bruce | Mar. 7, 1950 |